PIN LENGTH SORTER

Filed May 16, 1968 4 Sheets-Sheet 1

INVENTORS
JESSE ARONSTEIN
RICHARD JOHN GUNTHERT
CONRAD TROLLMANN

BY J. Jancin Jr.
ATTORNEY

United States Patent Office 3,498,452
Patented Mar. 3, 1970

3,498,452
PIN LENGTH SORTER

Jesse Aronstein, Latham, and Richard John Gunthert, Wappingers Falls, N.Y., and Conrad Trollmann, Redwood City, Calif., assignors to International Business Machines Corporation, Armonk, N.Y., a corporation of New York Filed May 16, 1968, Ser. No. 729,798
Int. Cl. B07c *5/06*
U.S. Cl. 209—73 18 Claims

ABSTRACT OF THE DISCLOSURE

A pin-sorting apparatus for sorting pins of different lengths in a continuous operation comprising feed means for feeding pins into grooves in a grooved surface, holding means for holding the pins in the grooves during movement of the grooved surface, and release means for sensing and releasing pins of a predetermined length from the grooves for collection by collection means. Unreleased pins are then removed, and the cycle repeated.

FIELD OF THE INVENTION

Sorting and classifying apparatus for sorting and classifying unsorted groups of solid materials into sorted groups, sorting being based upon a characteristic of the material, such as shape, length, weight, density, or similar properties, in continuous or batch operation.

PRIOR ART

With increasingly sophisticated electronic equipment in use today concurrent with the demand for high speed production techniques to manufacture such equipment, such high speed techniques must have the ability to operate at high speed and the concurrent ability to do an accurate job with a minimum of inspection. Many electronic components utilize pins, made of high conductivity materials such as copper, silver, copper-silver, etc., as electrical contacts for such devices. Such devices include solid logic technology modules, as are used in production models of IBM data processing equipment. A single data processing unit may contain many thousands of such SLT modules, each of which may have a minimum of 12 of such pins, usually about .018–.022" in diameter, and about ½" in length. The manufacturing tolerances of such modules require these pins to be accurate in length, unbent, and free of corrosive products that might damage the contacts, the modules, or the module connectors into which the modules are inserted. Further, the tens of thousands of such pins utilized in short periods of time requires sorting and checking to see that such conditions are, in fact, present before use of the pins on the expensive modules. This is difficult and costly to do by hand operations.

Thus, it is an object of this invention to sort many different lengths of pins from a mixed group of such pins in a single operation.

It is a further object of this invention to utilize machine processes for such sorting, that will minimize damage such as bending to said pins, and minimize corrosion problems attendant with hand operations.

Still another object of this invention is to allow sorting of pins in a continuous cycle apparatus commensurate with high speed sorting operations.

SUMMARY OF THE INVENTION

These and other objects are met by the pin-sorting apparatus of this invention. Briefly stated, this apparatus comprises a feed means for feeding pins into grooves upon a grooved surface of a pin-carrying means, such as the outer surface of a disc. The pins are fed into the grooves until they contact or "bottom" against a reference surface. The pins thus extend to known distances, and are measurable from the reference surface. Pin-holding means, such as a vacuum means, holds the pins in the grooves as the disc, for example, is rotated toward a pin-releasing means. The pin-releasing means may comprise a series of release blocks situated at a known distance from the reference surface and in a position to liftingly contact the pins, breaking the holding force of the vacuum. The pins, so released, may be collected by collecting means, such as a bin located beneath each release block if the system is designed such that the pins, upon release from the grooves, will fall by gravity into a bin. Any unsorted pins are then removed from the groove, rejected, and the disc rotated in turn to the feed position to repeat the cycle. Additional checking means may be utilized to assure that each groove is occupied by but one pin.

These and other objects of the invention will best be understood in conjunction with the following specification and accompanying drawings.

GENERAL DESCRIPTION

The pin-sorting apparatus of this invention will best be understood by describing the apparatus in terms of a preferred embodiment. It is clear that other embodiments utilizing the inventive concepts of this invention may also be utilized, as will be discussed later.

Figure 1:
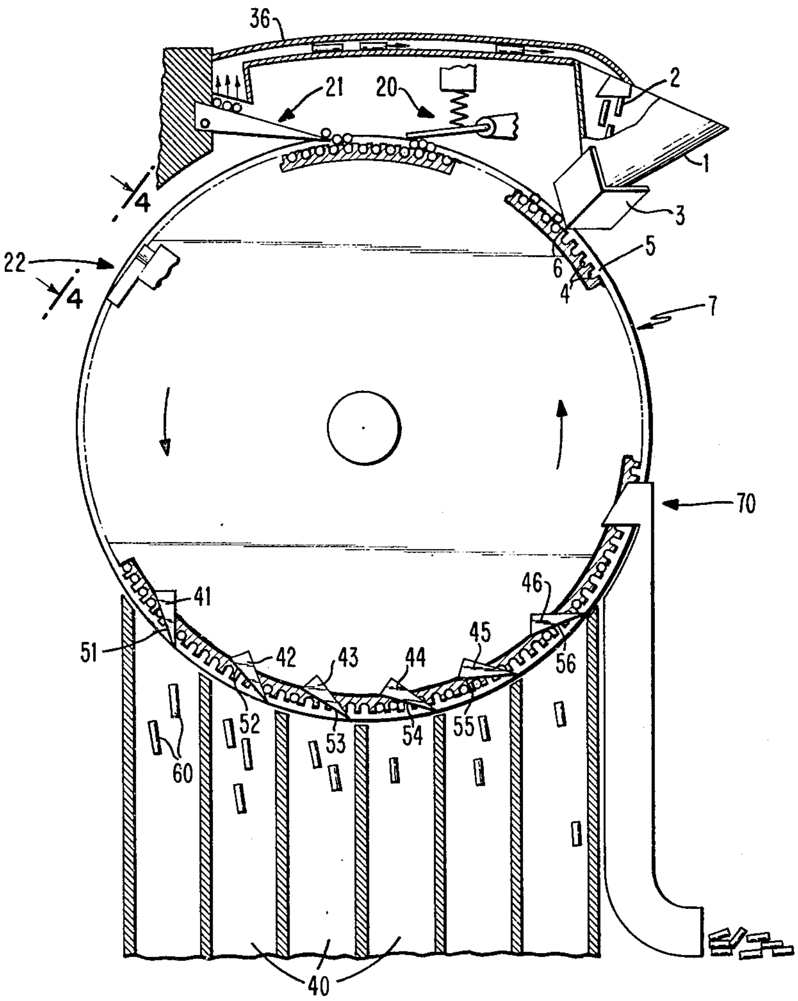
FIGURE 1 is a schematic drawing showing the overall concept involved, showing a pin-sorting apparatus for sorting six different lengths of pins in a single operation.

FIGURE 1 schematically shows the overall apparatus of this invention in a preferred embodiment. The pin-sorting apparatus comprises a funnel 1 into which pins 2 from a pin source (not shown) are fed. The funnel 1 in turn feeds the pins into an angled-trough means 3 which aligns the pins parallel to the direction of the trough. The pins being sorted are greater in length than in width. The pins then enter into grooves 4 on a grooved surface 6 upon a pin-carrying means 7. The pin-carrying means 7 in this embodiment is in the form of a disc. The funnel 1 and trough 3 are stationary while the pin-carrying means 7 rotates counter-clockwise as shown by the arrows. Thus as the pin-carrying means 7 rotates, the pins continually fill empty grooves 4 as they pass the trough 3.

To maintain the pins in some ordered relationship for later sorting, the pins are fed from the trough 3 into the groove 4 in such a manner that they will contact or "bottom" on one end of the pins against reference surface 5. Thus, the length of any given pin or all pins may be measured with reference to the reference surface.

Figure 2:
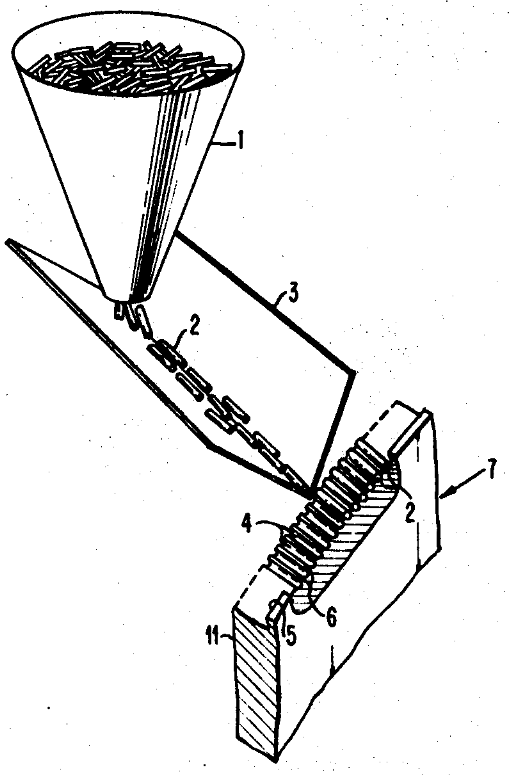
FIGURE 2 shows a funnel-trough pin-feeding means for feeding pins to be sorted into a grooved surface.

Reference to FIGURE 2 shows the funnel 1 feeding pins 2 into trough 3. The pins assume a parallel relationship with the V-direction of the trough, as shown. A series of grooves 4 upon grooved surface 6 is also shown. The pins, as they leave the trough 3, enter into the grooves 4 in grooved surface 6, and bottom against a protruding reference surface 5.

It is clear from both FIGURE 1 and FIGURE 2 that as the pin-carrying means 7 rotates past the trough 3, successive grooves 4 will be filled with pins 2, which bottom against reference surface 5.

It is necessary to hold the pins in the grooves to maintain their alignment with the reference surface, and to prevent the pins from falling out of the grooves by jarring, centrifugal force, or any other effect. However, it is also necessary for later operations, to assure that whatever pin-holding means is utilized uses a pin-holding force sufficient to hold the pin in the groove during all processing operations, but is insufficient to retard release of the pin from the groove during a later pin-release operation by application of a pin-releasing force. The preferred method of doing this is illustrated in FIGURE 3.

Figure 3:
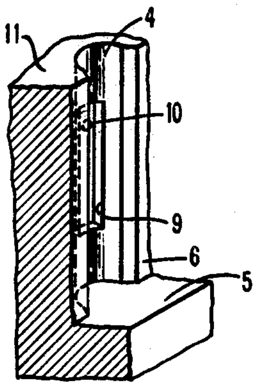
FIGURE 3 shows detail of a groove within the grooved surface, including a vacuum chamber therein.

FIGURE 3 shows reference surface 5, grooved surface 6, and groove 4. Within groove 4 is recessed chamber 9 having an orifice 10, leading to a vacuum means. When a pin occupies the groove 4, the application of vacuum means to the recess 9 via orifice 10 will cause a vacuum to be formed in the vacuum recess 9 between a pin and the groove 4. This will hold the pin in position, and is an example of a pin-holding means. This pin-holding means has sufficient pin-holding force to hold the pin in position in the groove during subsequent operations. When the vacuum is broken by a pin-releasing force in a later part of the apparatus, the vacuum means, pumping through the small orifice 10, is insufficient to quickly draw a new vacuum in recessed chamber 9, thus allowing the pin to be removed from groove 4.

It should also be noted that the pin will extend beyond the end of groove 4, indicated by a terminating surface 11, in this particular embodiment. It will be clear that this need not necessarily be so in other embodiments.

Referring now to FIGURE 1, as pins are fed from trough 3 into groove 4 in grooved surface 6 of pin-carrying means 7, it is possible for some pins to be caught between two grooves, or to rest upon a pin already in a groove, or to be held upon another pin due to vacuum leak. This situation is illustrated clearly in FIGURE 4, where pin 13 rests upon pin 15 and grooved surface 6 on pin-carrying means 7, without occupying a groove itself. As pin 13 and pin 15 may not be of the same length, it is necessary that pin 13 either be moved to fill an empty groove, or be removed from the grooved surface 6.

Checking means may be utilized to assure that only one pin occupies one groove at one time, and that no excess pins are on the grooved surface. The excess pins are simply defined as those pins not occupying a groove. It is further clear at this time, that each groove should be of a depth sufficient to carry but a single pin.

Figure 4:
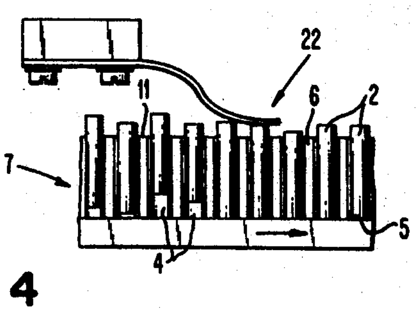
FIGURE 4 is a pin-pusher mechanism for seating in the grooves against a reference surface.
Figure 5:
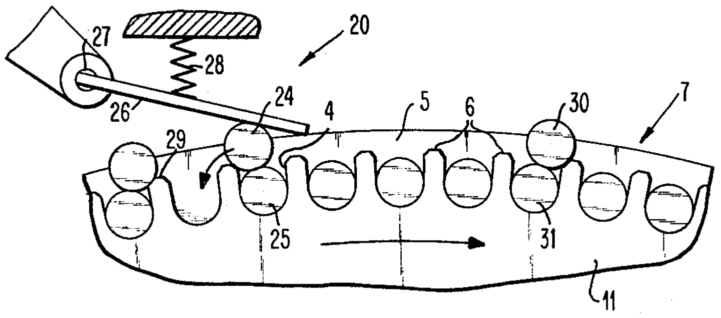
FIGURE 5 shows the operation of a pin-slider means to push pins into vacant grooves.
Figure 6:
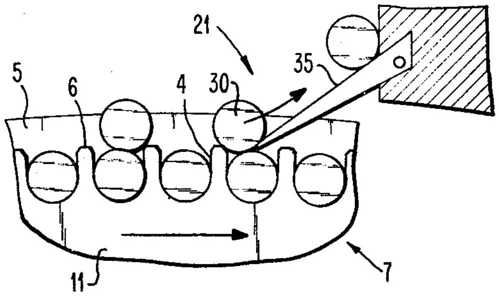
FIGURE 6 shows pin-picker means for removing excess pins from the grooved surface of the pin-carrying means.

Referring to FIGURE 1, checking means, which may comprise means for pushing the pins into grooves, means for removing pins from the surface, and means for urging the pins against the reference surface, are shown as pin-sliding means 20, pin-picker means 21, and pin-pusher means 22.

Where situations such as that shown by FIGURE 4 arise, the pins may be slid into the next vacant groove by use of pin-slider means as shown in FIGURE 5. FIGURE 5 shows a pin 24 resting upon grooved surface 6 and another pin 25 within a groove 4. Pin 25 rests in turn on one of its ends against the reference surface 5. As the pin-carrying means 7 moves in the direction as shown by the arrow, pin 24 comes into contact with a pin-slider bar 26 which is part of a pin-slider means. Pin-slider bar 26 is hinged at position 27, and has pressure applied to it by pressure means 28, such as a spring.

In a situation such as shown in FIGURE 5, the pin-slider means via pin-slider bar 26 will cause pin 24 to be slid into the next vacant groove, shown here as the next successive groove. To facilitate such sliding, it has been found that if the surface area 29 delineating the spacing between adjacent grooves is limited to substantially one-third the thickness of the pins being sorted, than such sliding-filling of empty grooves is best achieved.

Where empty grooves are not available, and successive sliding of the pins does not locate an empty groove, pressure may build up against the pin-slider bar 26 sufficient to overcome the pressure means 28, causing pin-slider bar 26 to rise, allowing that pin causing the pressure to escape through the pin-slider system. Such a pin that has done this is shown as pin 30 resting upon pin 31.

To remove such excess pins at the next stage of the apparatus, one need only employ a pin-picker means 21 which utilizes a pin-picker knife 35, adjusted to ride just above the grooved surface 6. Excess pins, as illustrated by pin 30, will be picked off the surface by the picker knife 35, and by a return means 36, shown in FIGURE 1, may be returned to the funnel 1.

Thus, referring back to FIGURE 1, there is shown generally a pin-feed means comprising a funnel 1 and trough 3, for feeding pins 2 into grooves 4 upon a grooved surface 6, the pins bottoming against a reference surface 5, and being held by a pin-holding means, such as vacuum means. The pin-carrying means 7 moves from the pin-feed means to checking means, which comprises in this embodiment, pin-slider means 20 and pin-picker means 21. The pin-carrying means 7 which now contains but a single pin in each groove, next comes into contact with pin-pusher means 22, which may be included within the checking means, which, by spring-loaded application of pressure upon the pins, urges the pins into intimate contact with the reference surface 5.

FIGURE 1 further shows a series of pin-collection means in the form of pin-collection bins 40. These bins are located in a position to collect pins released by pin-releasing means from the grooves. In this embodiment, such pin-releasing means are illustrated as comparing release blocks 41–46, having leading edges 51–56, respectively. The release blocks are positioned relative to the pin-carrying means 7 such that the leading edge of each block will contact a pin protruding beyond the terminating edge of a groove 4. Since all pins are in contact with reference surface 5, the leading edge of the release blocks may be located so as to make contact with only those pins protruding a predetermined length from the reference surface. If more than a single release block is utilized, it is clear that the first of such release blocks must contact pins of a greater predetermined length than a second consecutive release block, etc.

Contact of a pin on a moving pin-carrying means 7 with a stationary release block 41 at leading edge 51 results in a pin-releasing force being applied to the pin in a groove 4. As the leading edge 51 in this embodiment is shaped in a knife-blade form, angled to liftingly remove the pin as contact between the leading edge 51 and a pin is made, the pin will be lifted, breaking the vacuum within the groove. Thus, the pin-releasing means overcomes the force of the pin-holding means. The orifice 10 (FIGURE 3) in recess 9 is too small to allow the vacuum means to quickly restore the vacuum, thus allowing total release of the pin from the holding force in the groove.

In the embodiment shown in FIGURE 1, a pin so released by contact with leading edge 51 of release block 41 of pin-releasing means will fall by gravity into a collection bin. In the embodiment shown, if each of the release blocks 41–46 shown is set such that release block 41 releases the longest pin relative to the reference surface 5, and each succeeding block releases a succeedingly smaller pin length relative to the reference surface, six different pin lengths may be sorted in a single operation. Clearly, those pins sorted by release block 41 and each succeeding block will contain a range of pins, the tolerance of which is the length difference with reference to the reference surface between the position of the leading edges of the successive blocks, for example 51–52, 52–53, etc.

Figure 7A:
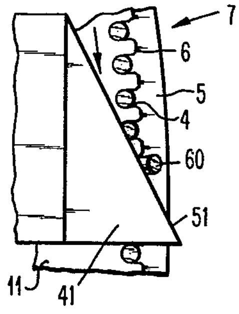
FIGURES 7*a* and 7*b* show the leading edge of a release block as part of pin-releasing means, for removing pins from the grooves on the grooved surface.
Figure 7B:
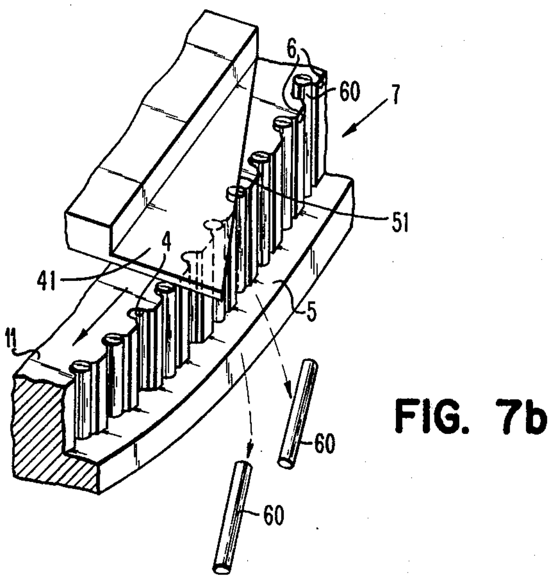

FIGURE 7*a* illustrates a release block 41 having a leading edge 51 making lifting contact with a pin 60 carried in a groove in pin-carrying means 7. It is evident from the position and shape of the leading edge 51, that pin 60 will be liftingly contacted by the leading edge, breaking the vacuum or holding means. FIGURE 7*b* shows pin 60 falling by gravity from its groove after being liftingly contacted by the leading edge 51.

Referring to FIGURE 1, there is shown pin-removal means 70, for removing pins still remaining in the grooves 4 after passing the final release block 46. These pin-removal means may constitute an additional removal block, or can comprise a jet of air being forced through the orifice normally used for vacuum means, or any other desired technique for clearing the grooves 4 for reloading as the pin-carrying surface 7 rotates back to its starting position in the area of the funnel 1 and trough 3.

Thus, referring to FIGURE 1, a preferred embodiment of this invention comprises a funnel 1 feeding pins from a source (not shown) to trough 3 into grooves 4 on grooved surface 6 of pin-carrying means 7, said pins bottoming on reference surface 5. As pin-carrying means 7 revolves, the grooved surface 6 passes checking means comprising pin-slider means 20, pin-picker means 21, and pin-pusher means 22. Pin-carrying means 7 then continues to sorting stations shown as pin-releasing means comprising pin-releasing blocks 41–46 having leading edges 51–56 to cause gravity fall of the pins into pin-collection means, shown as pin-collection bins 40. As the pin-carrying means 7 continues to rotate, unsorted pins remaining in the grooves 4 are removed by pin-removal means 70, and the cycle repeated. Motion-imparting means to move the pin-carrying means in revolving motion is necessary, but again, is not shown. Any standard and known means of imparting such motion may be utilized.

It should here be noted that while in the preferred embodiment pin-carrying means 7 comprises a rotatable disc, it is relative motion that is necessary, and thus the pin-feed means, pin-holding means, pin-collection means, pin-releasing means, and pin-removal means may move relative to the pin-carrying means, by motion of either or both of these sets of means.

Figure 8:
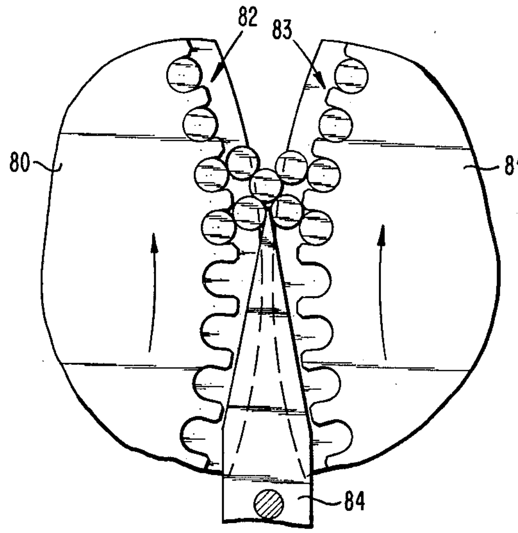
FIGURE 8 shows a guide-bar means in the form of a V-bar for use in loading two sorting discs simultaneously.
Figure 9:
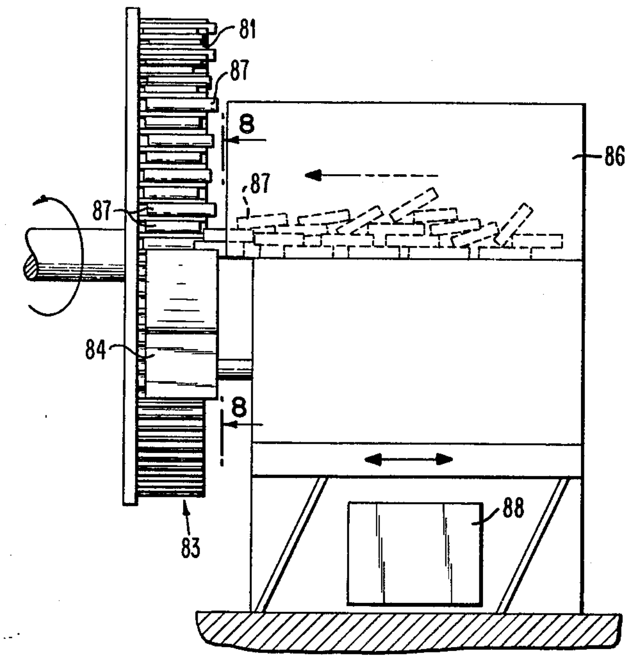
FIGURE 9 shows vibratory-assist means to assist in the feeding of pins into the grooves within a grooved surface of a pin-carrying means.

FIGURES 8 and 9 show a further embodiment of this invention, whereby a first pin-carrying means 80 and a second pin-carrying means 81 may be simultaneously loaded with pins into grooves in grooved surfaces 82 and 83. This is achieved by feeding pins from a funnel through a trough, similar to that previously shown in FIGURES 1 and 2, onto a guide-bar means such as V-bar 84. As pin-carrying means 80 and 81 pass the V-bar 84, pins will be loaded into the grooves in grooved surfaces 82, 83 of the adjacent pin-carrying means 80 and 81.

FIGURE 9 further shows the V-bar 84 in the pin-sorting apparatus. Only one disc, 80, for example, is shown. Thus, a trough 86 is shown feeding pins 87 onto V-bar 84, which loads the pins into pin-carrying means 80. Both the V-bar 84 and the trough 86, and a funnel means (not shown) may be vibratorily-assisted by means of a vibrator 88, for example. Such vibratory-assists will aid in the movement and alignment of the pins. Of course, in FIGURE 1, the preferred embodiment, funnel 1 and trough 3 may also be vibratorily assisted.

Thus, the preferred embodiment of the pin-sorting apparatus of this invention shows a continuous rotary disc unit. As stated earlier, however, the disc may remain stationary with the other feed means, release means, etc., mounted fixedly on a movable circumferential support.

Various pin-carrying means other than that described may also be utilized. Such a pin-carrying surface might be in the form of a conveyor belt, or it could be in the form of a ring with the grooved surface on the interior circumference of the ring. At sufficient rotary speed, pins fed into grooves in such a grooved surface will be held in place by centrifugal force until release by some release means, such as release blocks described previously.

Similarly, pin-feed means need not be trough and funnel assemblies, but could be a positive feed means for projecting pins under pressure, such as air pressure, into the groove.

Pin-holding means may include any means such as a hasp, a well as vacuum means described, and will include in general any mechanical means capable of the desired function.

Pin-collection means, of course, can include aside from bins, positive acting means, such as vacuum means to "suck up" the released pins. If magnetic pins are being utilized, such pin-collection means can utilize magnetic collection means.

Pin-releasing means may include positive pressure bursts of air from a release jet, or the localized release of an induced magnetic field if the pins are magnetic and are held in the grooves by magnetic pin-holding means. Pin-releasing means may also have built therein various sensing means for determining the length of the pin in the groove, by means of light reflection using photoelectric cells if the pins are shiny and the grooves are dull; magnetic sense means, such as a magnetic head in proximity to magnetic pins in said grooves; or other similar systems. These systems would trigger a positive release means to release those predetermined pins from the grooves. Such a system might require, however, certain electrical interconnection circuitry not needed in the preferred embodiment of this invention.

Pin-removal means may include any means for removing the pins from the grooves, such as air blasts, removal blocks if all pins protrude beyond the terminating edge of the groove, or other means.

Motion-imparting means, of course, may be any standard electric motor, for example. It is desirable that such motion-imparting means transmit virtually vibration-free motion to the moving part of the system, and be adjustable for varying conditions.

Vibratory-imparting means may include any of the well-known vibratory units.

While the checking means shown in the preferred embodiment comprises a combination of pin-slider means, pin-picker means, and pin-pusher means, any of these units may be employed individually, or none of these units employed, depending on how carefully pins may be fed into the grooves, and the extent of the problem and tolerances that may be created by not having such checking means. Alternatively, additional checking means may be necessary depending upon the desires of the user.

Pin-sorting apparatus such as that described in this invention has uses beyond the field for which such a device was originally developed, here the sorting of electronic pins. Needle-bearings, for example, could be sorted by such a device; as well as blocks of wood, dowels, or any other unit of virtually any shape, be it square, rectangular, round, etc., provided it is adaptable for use in a system such as that described herein. The size of the disc involved in the preferred embodiment is a function of the size of the pin. Clearly, this is true for all systems. Thus, a one inch diameter wood block 8″ long would require a much larger disc for efficient operation than a .020 diameter pin ½″ in length. Such adjustments as are necessary to compensate for the particular materials to be sorted, will be evident to one skilled in the art.

While the invention has been particularly shown and described with reference to preferred embodiments thereof, it will be understood by those skilled in the art that various changes in form and details may be made therein.

What is claimed is:

1. A pin-sorting apparatus for sorting pins by length comprising:

pin-carrying means having a grooved surface comprising grooves therein for receiving and carrying pins to be sorted, said grooves terminating at a reference surface, each of said grooves being of a depth sufficient to accommodate only a single pin;

pin-feed means located at a first successive position relative to said pin-carrying means, for feeding pins from a pin source into said grooves and to urge the pins into contact with said reference surface;

releasable pin-holding means for applying a pin-holding force sufficient for holding the pins in said grooves and insufficient to retard release of the pins by application of a pin-releasing force to the pins;

pin-collection means located at a second successive position relative to said pin-carrying means, for collecting pins released from said grooves when said pin-releasing force is applied to the pins;

pin-releasing means for determining and releasing from said grooves by application of said pin-releasing force all pins of a predetermined length measured from the position of said reference surface, said pin-releasing means located relative to said pin-collection means to allow collection of the pins by said pin-collection means after release by said pin-releasing means;

pin-removal means for removing those pins not released from said grooves by said releasing means, located at a third successive position relative to said pin-carrying means; and motion-imparting means for imparting relative motion between said pin-carrying means and the said other means in a direction from said first to said second to said third successive positions.

2. The pin-sorting apparatus of claim 1 wherein said pin-carrying means comprises at least one rotatable disc.

3. The pin-sorting apparatus of claim 2 wherein said rotatable disc has said grooves upon the outer surface of said disc.

4. The pin-sorting apparatus of claim 1 wherein said pin-feed means comprises funnel and trough means for feed of the pins from said source into said grooves.

5. The pin-sorting apparatus of claim 4 wherein said pin-feed means includes vibratory-imparting means for assisting the feeding of pins from said source into said grooves.

6. The pin-sorting apparatus of claim 1 wherein said pin-carrying means comprises two rotatable discs having said grooves upon the outer surface of each of said discs, said rotatable discs located in spaced relationship to each other; and said pin-feed means comprises a funnel and trough means for feed of the pins from said source to a guide bar means located between said discs, to feed the pins into said grooves in each of said discs simultaneously.

7. The pin-sorting apparatus of claim 6 wherein said guide bar means comprises a vibratory-assisted V-bar.

8. The pin-sorting apparatus of claim 1 wherein said pin-holding means comprises vacuum means for obtaining a vacuum between a pin positioned in said groove and the walls of said groove.

9. The pin-sorting apparatus of claim 8 wherein said groove has a recessed chamber therein, said vacuum means creating a vacuum between a pin positioned in said groove and abutting said recessed chamber via connection means from said vacuum means to said recessed chamber.

10. The pin-sorting apparatus of claim 1 wherein said grooved surface has said grooves spaced at a distance substantially one-third the thickness of the pins being sorted.

11. The pin-sorting apparatus of claim 1 including checking means located between said pin-feed means and said pin-releasing means, for assuring that each of said grooves is occupied by no more than a single pin, and removing excess pins from said grooved surface.

12. The pin-sorting apparatus of claim 11 wherein said checking means comprises pin-slider means for sliding excess pins along said surface to fill empty grooves not filled by said pin-feed means.

13. The pin-sorting apparatus of claim 11 wherein said checking means comprises pin-picker means for removing excess pins from said surface.

14. The pin-sorting apparatus of claim 11 wherein said checking means comprises pin-pusher means for urging the pins into intimate contact with said reference surface.

15. The pin-sorting apparatus of claim 1 wherein said pin-releasing means comprises at least one release block having a leading edge for applying said pin-releasing force in a lifting manner when said leading edge contacts a pin during relative motion between said release block and the pin, lifting the pin from said groove, allowing the pin to be collected by said collection means; said leading edge positioned relative to said grooved surface of said pin-carrying means at a predetermined length from said reference surface so as to intercept and cause release from said grooves of pins of said predetermined or greater length by lifting contact with said pins, while not affecting release of pins of less than such predetermined length.

16. The pin-sorting apparatus of claim 15 wherein said pin-releasing means comprises at least a first and second of said release blocks, consecutively positioned relative to said grooved surface to release pins first of a first predetermined length at said first release block and then of a second predetermined length, at said second release block, where said first predetermined length is greater than said second predetermined length.

17. The pin-sorting apparatus of claim 15 wherein said pin-collection means comprises a series of collection bins located relative to said release blocks, for individually collecting pins released by each of said release blocks.

18. The pin-sorting apparatus of claim 1 wherein said pin-releasing means is located at a position relative to said pin-carrying means to allow the pins to fall by gravity into said pin-collection means upon release of the pins from said grooves by said pin-releasing means.

References Cited

UNITED STATES PATENTS

| | | | |
|---|---|---|---|
| 1,324,650 | 12/1919 | Dunn | 209—90 |
| 2,355,311 | 8/1944 | Linkner | 209—90 |
| 3,235,125 | 2/1966 | Sonntag | 221—299 |
| 3,248,789 | 5/1966 | Seaman | 29—428 |
| 3,275,120 | 9/1966 | Gardner. | |
| 3,386,577 | 6/1968 | Nolan et al. | 209—90 |

ALLEN N. KNOWLES, Primary Examiner

U.S. Cl. X.R.

209—74, 90